United States Patent
Kawakami

(10) Patent No.: US 9,291,141 B2
(45) Date of Patent: Mar. 22, 2016

(54) CONTROL DEVICE AND CONTROL METHOD FOR INTERNAL COMBUSTION ENGINE

(71) Applicant: MITSUBISHI ELECTRIC CORPORATION, Chiyoda-ku, Tokyo (JP)

(72) Inventor: Teruaki Kawakami, Chiyoda-ku (JP)

(73) Assignee: Mitsubishi Electric Corporation, Tokyo (JP)

( * ) Notice: Subject to any disclaimer, the term of this patent is extended or adjusted under 35 U.S.C. 154(b) by 217 days.

(21) Appl. No.: 14/220,699

(22) Filed: Mar. 20, 2014

(65) Prior Publication Data

US 2015/0107557 A1 Apr. 23, 2015

(30) Foreign Application Priority Data

Oct. 17, 2013 (JP) .................................. 2013-216073

(51) Int. Cl.
| | |
|---|---|
| F02P 5/00 | (2006.01) |
| F02P 5/145 | (2006.01) |
| F02D 41/30 | (2006.01) |
| F02P 5/153 | (2006.01) |
| F02D 35/02 | (2006.01) |
| F02P 5/152 | (2006.01) |

(52) U.S. Cl.
CPC .............. *F02P 5/145* (2013.01); *F02D 35/023* (2013.01); *F02D 35/028* (2013.01); *F02D 41/3041* (2013.01); *F02P 5/153* (2013.01); *F02P 5/152* (2013.01)

(58) Field of Classification Search
CPC ............ F02P 5/14; F02P 5/145; F02P 5/152; F02P 5/153; F02D 35/023; F02D 35/025; F02D 35/028; F02D 41/3041

USPC ........................................ 123/406.26, 406.25
See application file for complete search history.

(56) References Cited

U.S. PATENT DOCUMENTS

| | | | | |
|---|---|---|---|---|
| 6,283,096 B1 * | 9/2001 | Kimura | ..................... | F01L 9/02 123/305 |
| 6,354,264 B1 * | 3/2002 | Iwakiri | ................. | F02D 35/023 123/305 |
| 7,017,548 B2 * | 3/2006 | Sawada | ................. | F02D 31/001 123/339.11 |

FOREIGN PATENT DOCUMENTS

| | | |
|---|---|---|
| JP | 2010-014058 A | 1/2010 |
| JP | 2011-252471 A | 12/2011 |

OTHER PUBLICATIONS

Japanese Office Action (Preliminary Notice of Reasons for Rejection), dated Jun. 24, 2014, Application No. 2013-216073.

* cited by examiner

*Primary Examiner* — Hai Huynh

(74) *Attorney, Agent, or Firm* — Sughrue Mion, PLLC; Richard C. Turner

(57) ABSTRACT

Provided is a control device for an internal combustion engine, which enables enlargement of an operation region in which homogenous-charge compression ignition combustion enabling the generation of NOx to be suppressed and fuel efficiency to be improved can be performed. An ignition-timing control section (23) continuously and repeatedly controls an ignition timing to a retard side when a first combustion-state index reaches a predefined predetermined upper limit value of the first combustion-state index and controls the ignition timing to an advance side when a second combustion-state index reaches a predefined predetermined upper limit value of the second combustion-state index.

9 Claims, 10 Drawing Sheets

CONTROL DEVICE AND CONTROL METHOD FOR INTERNAL COMBUSTION ENGINE

BACKGROUND OF THE INVENTION

1. Field of the Invention

The present invention relates to a control device and a control method for an internal combustion engine, relating to a homogenous-charge compression ignition internal combustion engine which compresses an air/fuel mixture formed in a combustion chamber to cause self-ignited combustion.

2. Description of the Related Art

In a homogenous-charge compression ignition internal combustion engine, an air/fuel mixture formed by mixing a fuel and air in advance is compressed by a piston. As a result, a temperature of the air/fuel mixture reaches a self-ignition temperature to start combustion in a plurality of portions of the combustion chamber in synchronization.

In a common spark ignition internal combustion engine, it is difficult to increase the temperature of the air/fuel mixture to the self-ignition temperature by using an adiabatic compression action. On the other hand, in the homogenous-charge compression ignition internal combustion engine, a compression ratio is set larger than that of the spark ignition internal combustion engine so that an increase in temperature by the adiabatic compression is enhanced. At the same time, means such as an intake-air heater for increasing the temperature of the air/fuel mixture is used. In this manner, the homogenous-charge compression ignition combustion is realized.

With the homogenous-charge compression ignition combustion in which the temperature of the air/fuel mixture reaches the self-ignition temperature to start the combustion in the plurality of portions of the combustion chamber in synchronization, combustion with an air/fuel mixture diluted with a large amount of exhaust gas recirculation (EGR) gas or a super-lean air/fuel mixture, which can suppress an increase in combustion temperature, can be realized. The combustion with the air/fuel mixture diluted with the large amount of EGR gas or the super-lean air/fuel mixture is difficult to realize with conventional flame propagation combustion with spark ignition.

Therefore, in the homogenous-charge compression ignition combustion, the generation of NOx can be suppressed as compared with the conventional flame propagation combustion with spark ignition. Further, a high fuel efficiency improvement effect is provided by the increased compression ratio and the lean combustion. Therefore, the homogenous-charge compression ignition combustion is desired to be realized over a wide operation region.

Moreover, the following control device for an internal combustion engine is also known. In order that the air/fuel mixture temperature may reach the self-ignition temperature by using an increase in temperature caused by heat energy of a burnt gas left in the combustion chamber due to advanced timing of closing an exhaust valve (hereinafter referred to as "internal EGR gas"), an increase in temperature caused by combusting the air/fuel mixture in the vicinity of an ignition device with spark ignition (hereinafter referred to as "ignition assist"), and an increase in temperature caused by a combustion pressure, an internal EGR gas amount and ignition timing are controlled so that a combustion-state parameter converges to a target value at which good combustion is obtained (see Japanese Patent Application Laid-open No. 2011-252471, for example).

However, the related art has the following problem.

In the homogenous-charge compression ignition internal combustion engine, in a high-load operation region in which the fuel amount is large and the combustion temperature is high, the air/fuel mixture temperature increases with the increase in temperature of the internal EGR gas (burnt gas remaining in the combustion chamber) due to the increased combustion temperature. As a result, pre-ignition corresponding to an advanced self-ignition timing or rapid combustion corresponding to a high combustion speed occurs to generate combustion noise.

In order to lower the air/fuel mixture temperature, the internal EGR gas amount is set smaller as the load becomes higher regardless of an engine rpm, as shown in FIG. 13 which shows the setting of the internal EGR gas amount with respect to the engine rpm and the load.

In this case, however, the effect of the EGR gas for lowering the speed of the combustion is also reduced by the reduction in the internal EGR gas amount. Therefore, the combustion noise generated due to the pre-ignition or the rapid combustion cannot be suppressed in the high-load operation region.

Moreover, in the above-mentioned case, even if the increase in the air/fuel mixture temperature caused by the increase in temperature is to be suppressed by retarding the ignition timing, the internal EGR gas temperature, which is higher, is dominant over the air/fuel mixture temperature. As a result, the effect for suppressing the combustion noise cannot be obtained.

As a result, as shown in FIG. 14 which shows the effect of the load and the internal EGR gas amount on a combustion state, in a low-load state in which the combustion temperature is low and the internal EGR gas amount can be increased, the effect of the EGR gas for lowering the speed of the combustion can be obtained. Thus, the region of the internal EGR gas amount in which good combustion is obtained is enlarged.

On the other hand, in a high-load state in which the combustion temperature is high and hence the internal EGR gas amount is inevitably required to be set small, the effect of lowering the speed of the combustion cannot be obtained. Therefore, the region in which the combustion noise may occur becomes larger. Moreover, if the internal EGR gas amount is reduced to suppress the combustion noise, the air/fuel mixture temperature is lowered, and hence the combustion state undesirably enters a misfire region. As described above, in the high-load state, the region of the internal EGR gas amount in which good combustion is obtained is narrower, which limits the operation region.

Further, in the control device for the internal combustion engine described in Japanese Patent Application Laid-open No. 2011-252471, the internal EGR gas amount and the ignition timing are controlled so that a crank angle at which a maximum in-cylinder pressure used as a combustion-state parameter is obtained becomes equal to a target value at which the good combustion is obtained.

For example, in the operation region in which the combustion noise is generated by the pre-ignition or the rapid combustion, the air/fuel mixture temperature is high, and therefore a maximum in-cylinder pressure angle is advanced from the target value. Thus, the air/fuel mixture temperature is lowered by reducing the internal EGR gas amount or retarding the ignition timing. In this manner, the maximum in-cylinder pressure angle is controlled to the target value to obtain the good combustion.

However, the above-mentioned control means the following. Specifically, the combustion state in the combustion-noise region or the misfire region shown in FIG. 14 is merely controlled to be stabilized to be a target specific combustion state in the operation region in which the good combustion is obtained under the same load. Therefore, the operation of the homogenous-charge compression ignition combustion cannot be performed in the high-load state in which a good combustion region is not present.

Further, the stabilization of the combustion at the target value which is a specific condition described in Japanese Patent Application Laid-open No. 2011-252471 corresponds to the stabilization of the combustion at a high temperature at which control margins of the internal EGR gas amount and the ignition timing become smaller, which makes it difficult to enlarge the operation region in which the homogenous-charge compression ignition combustion can be performed.

SUMMARY OF THE INVENTION

The present invention has been made to solve the problems described above, and has an object to provide a control device and a control method for an internal combustion engine, which enable enlargement of an operation region in which homogenous-charge compression ignition combustion enabling the generation of NOx to be suppressed and fuel efficiency to be improved can be performed.

According to one embodiment of the present invention, there is provided a control device for an internal combustion engine including an ignition device provided in a combustion chamber, the ignition device being configured to ignite an air/fuel mixture formed in the combustion chamber, the internal combustion engine being configured to combust apart of the air/fuel mixture, which is located in areas other than in vicinity of the ignition device, by homogenous-charge compression ignition combustion using an increase in temperature, which is caused by combusting apart of the air/fuel mixture in the vicinity of the ignition device with spark ignition, and an increase in temperature caused by a combustion pressure, the control device including: a combustion-state detecting section for detecting a first combustion-state index relating to a combustion state brought about by the air/fuel mixture at a high temperature and a second combustion-state index relating to a combustion state brought about by the air/fuel mixture at a low temperature; and an ignition-timing control section for controlling an ignition timing based on the first combustion-state index and the second combustion-state index, the ignition-timing control section being configured to continuously and repeatedly control the ignition timing to a retard side when the first combustion-state index reaches a predefined predetermined upper limit value of the first combustion-state index and control the ignition timing to an advance side when the second combustion-state index reaches a predefined predetermined upper limit value of the second combustion-state index.

According to another embodiment of the present invention, there is provided a control method for an internal combustion engine including an ignition device provided in a combustion chamber, the ignition device being configured to ignite an air/fuel mixture formed in the combustion chamber, the internal combustion engine being configured to combust apart of the air/fuel mixture, which is located in areas other than in vicinity of the ignition device, by homogenous-charge compression ignition combustion using an increase in temperature, which is caused by combusting a part of the air/fuel mixture in the vicinity of the ignition device with spark ignition, and an increase in temperature caused by a combustion pressure, the control method including: detecting a first combustion-state index relating to a combustion state brought about by the air/fuel mixture at a high temperature and a second combustion-state index relating to a combustion state brought about by the air/fuel mixture at a low temperature; and controlling an ignition timing based on the first combustion-state index and the second combustion-state index, the controlling an ignition timing including continuously and repeatedly executing processing of controlling the ignition timing to a retard side when the first combustion-state index reaches a predefined predetermined upper limit value of the first combustion-state index and controlling the ignition timing to an advance side when the second combustion-state index reaches a predefined predetermined upper limit value of the second combustion-state index.

According to the control device and the control method for an internal combustion engine of the embodiment of the present invention, the ignition-timing control section (step) continuously and repeatedly controls the ignition timing to the retard side when the first combustion-state index reaches the predefined predetermined upper limit value of the first combustion-state index and controls the ignition timing to the advance side when the second combustion-state index reaches the predefined predetermined upper limit value of the second combustion-state index.

Therefore, the operation region in which the homogenous-charge compression ignition combustion enabling the suppression of generation of NOx and the improvement of the fuel efficiency can be performed can be enlarged.

DETAILED DESCRIPTION OF THE PREFERRED EMBODIMENTS

Figure 1:
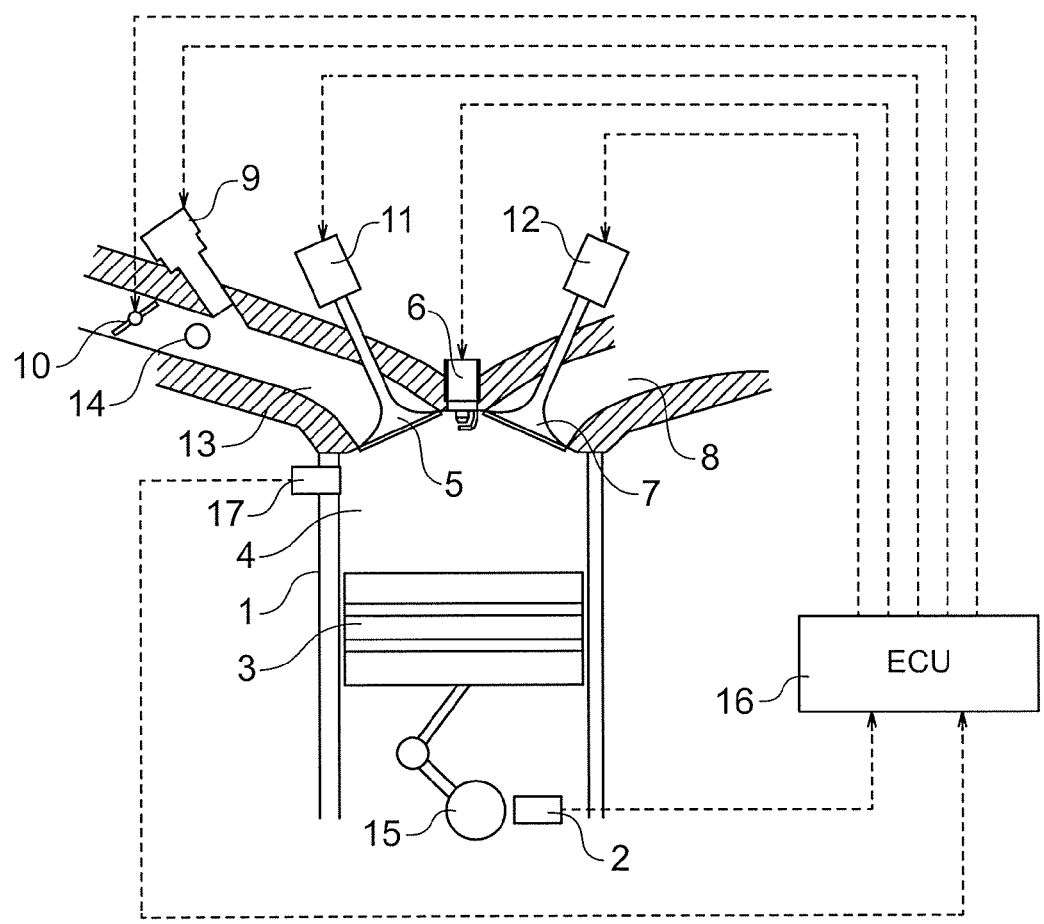
FIG. 1 is a configuration diagram illustrating the entire system including a control device for an internal combustion engine according to a first embodiment of the present invention.

In the following, a control device and a control method for an internal combustion engine according to preferred embodiments of the present invention are described referring to the accompanying drawings. In the drawings, the same or corresponding parts are denoted by the same reference symbols for description.

First Embodiment

FIG. 1 is a configuration diagram illustrating the entire system including a control device for an internal combustion engine according to a first embodiment of the present invention. In the following, a configuration of the internal combustion engine and a basic operation of a four-cycle internal combustion engine are described referring to FIG. 1.

As illustrated in FIG. 1, a crank-angle sensor 2 is provided to an internal combustion engine main body 1. The crank-angle sensor 2 outputs a pulse signal for detecting a rotation angle each time a crankshaft 15 rotates at a predetermined angle (for example, at every 10 degrees of the crank rotation angle). The pulse signal is used to calculate a crank angle and an engine rpm.

An intake-pipe pressure sensor 14 for detecting an intake-pipe pressure is provided to an intake pipe 13. Based on the intake-pipe pressure detected by the intake-pipe pressure sensor 14, a load of the internal combustion engine is calculated. An operating point is indicated together with an engine rpm.

A piston 3 moves in a combustion chamber 4 in a reciprocating manner. By downward movement of the piston 3, an air/fuel mixture of a fuel injected from a fuel injection device 9 and air whose intake amount into the combustion chamber 4 is adjusted by a throttle valve 10 is introduced into the combustion chamber 4 through an intake valve 5. With the downward movement of the piston 3, the air/fuel mixture introduced into the combustion chamber 4 is mixed with an internal EGR gas which is a burnt gas in the previous cycle while being widely dispersed in the combustion chamber 4 to form a uniform air/fuel mixture.

Subsequently, the air/fuel mixture is adiabatically compressed by upward movement of the piston 3. By an increase in temperature of the air/fuel mixture due to the adiabatic compression and an increase in temperature caused by spark ignition of an ignition device 6 provided at the top of the combustion chamber 4, homogenous-charge compression ignition combustion is realized. At this time, the piston 3 moves down. As a result, a combustion pressure is converted into kinetic energy.

Thereafter, the piston 3 starts moving up. By adjusting a timing of closing an exhaust valve 7 with respect to the crank angle, an internal EGR gas amount to be left in the combustion chamber 4 is controlled. Moreover, an unnecessary burnt gas is exhausted into an exhaust pipe 8 through the exhaust valve 7. Then, the burnt gas is purified by a catalyst (not shown) provided in the exhaust pipe 8 and is then released into an atmosphere.

In this case, a port-injection internal combustion engine in which the fuel injection device 9 is provided to the intake pipe 13 is exemplified. However, the internal combustion engine is not limited thereto. The control device for the internal combustion engine according to the first embodiment of the present invention may be applied to a direct-injection type internal combustion engine including the fuel injection device 9 provided in the combustion chamber 4, which directly injects the fuel into the combustion chamber 4.

An intake-valve driving mechanism 11 for driving the intake valve 5 is provided to the intake valve 5, whereas an exhaust-valve driving mechanism 12 for driving the exhaust valve 7 is provided to the exhaust valve 7. The intake valve 5 and the exhaust valve 7 are driven in synchronization with the rotation of the crankshaft 15 by a cam provided in the intake-valve driving mechanism 11 and a cam provided in the exhaust-valve driving mechanism 12, which are coupled to the crankshaft 15.

Further, each of the intake-valve driving mechanism 11 and the exhaust-valve driving mechanism 12 includes a phase variable mechanism capable of continuously changing a phase of the cam with respect to the crankshaft 15. By changing the phase of the exhaust valve 7 by the phase variable mechanism, the internal EGR gas amount can be adjusted.

An engine control unit (hereinafter referred to as "ECU") 16 provided in a vehicle interior or the like is a microcomputer for executing ignition-timing control and the like. The ECU 16 fetches a signal from an in-cylinder pressure sensor 17 provided to the combustion chamber 4 to detect a combustion state, and executes computation processing based on the fetched signal. Moreover, the ECU 16 outputs control signals for various actuators in accordance with the result of the computation processing to operate the actuators such as the ignition device 6.

Figure 2:
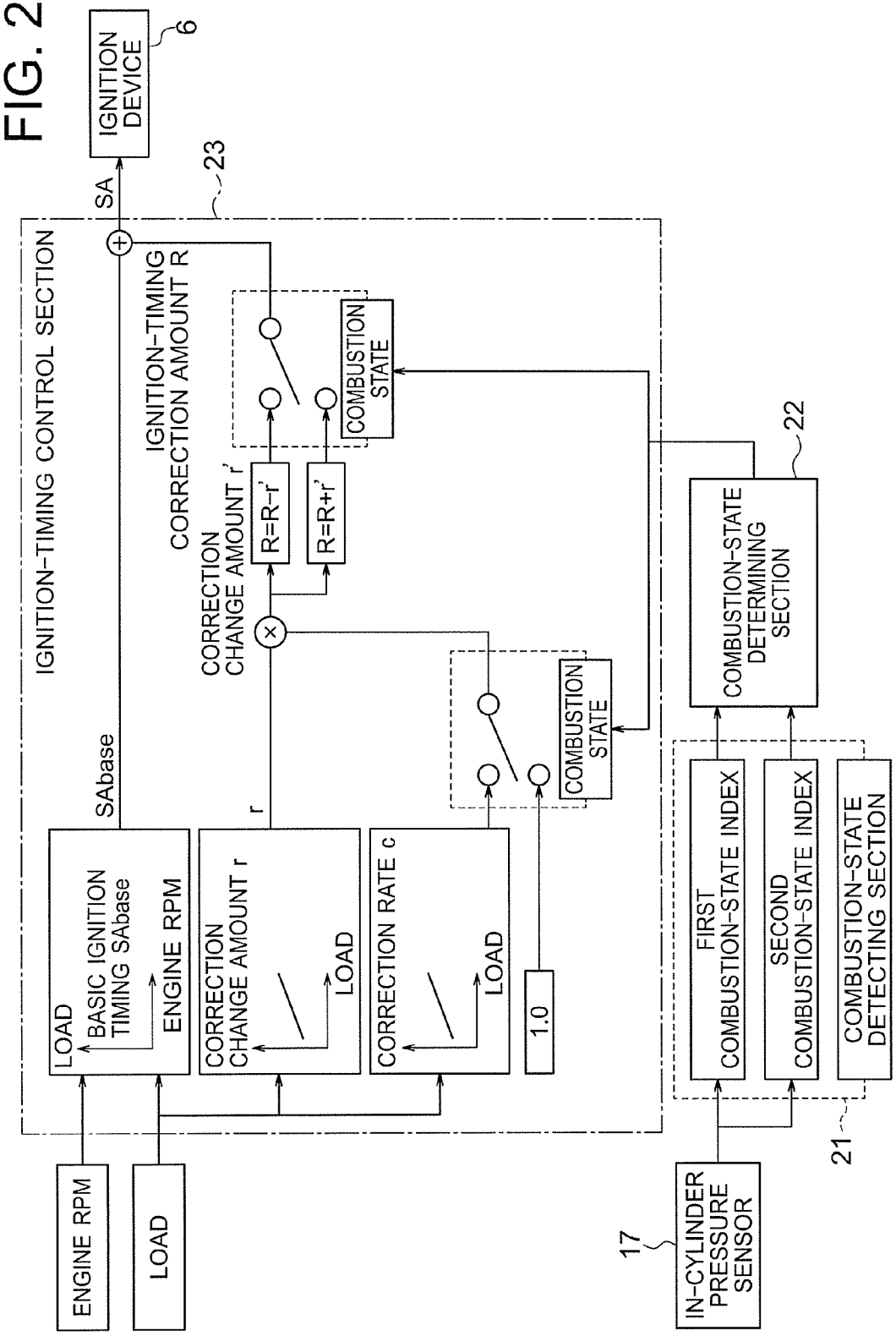
FIG. 2 is a block diagram illustrating an ECU of the control device for the internal combustion engine according to the first embodiment of the present invention.

FIG. 2 is a block diagram illustrating the ECU 16 of the control device for the internal combustion engine according to the first embodiment of the present invention. The ECU 16 is a microprocessor (not shown) including a CPU and a memory which stores a control program. Each of the blocks illustrated in FIG. 2 is stored as software in the memory.

As illustrated in FIG. 2, a basic ignition timing SAbase is first calculated based on the engine rpm and the load. Moreover, a correction change amount r and a correction rate c are calculated based on the load. On the other hand, a first combustion-state index and a second combustion-state index are calculated based on the result of detection by the in-cylinder pressure sensor 17. Based on the thus calculated first combustion-state index and second combustion-state index, the combustion state is determined.

In this case, the first combustion-state index is a value relating to pre-ignition corresponding to an advanced self-ignition timing or a rapid combustion corresponding to an increased combustion speed, which are caused by the air/fuel mixture at a high temperature. The second combustion-state index is a value relating to a slow combustion at a low combustion speed or a combustion fluctuation, which are caused by the air/fuel mixture at a low temperature.

Subsequently, which of the calculated correction rate c and 1.0 is to be output as a correction rate for the ignition timing is determined based on the result of determination of the combustion state. Then, by multiplying the correction change amount r by the determined correction rate for the ignition timing, a correction change amount r' is calculated. Further, based on the result of determination of the combustion state, which of retard control and advance control is to be used for a direction of correction of the ignition timing is determined.

Next, in accordance with the determined direction of correction of the ignition timing, that is, the retard control or the advance control, the correction change amount r' is added to or subtracted from an ignition-timing correction amount R of the previous cycle to calculate an ignition-timing correction amount R of the current cycle. Thereafter, by adding the ignition-timing correction amount R to the basic ignition timing SAbase, a target ignition timing SA is determined. Then, spark ignition is executed by the ignition device 6.

In FIG. 2, a block for calculating the first combustion-state index and the second combustion-state index based on the result of detection of the in-cylinder pressure sensor 17 is a combustion-state detecting section 21, a block for determining the combustion state based on the first combustion-state index and the second combustion-state index is a combustion-state determining section 22, and a block for determining the ignition timing SA based on the engine rpm, the load, and the combustion state is an ignition-timing control section 23.

In the following, functions relating to the control device for the internal combustion engine according to the first embodiment of the present invention are described. First, reasons of limitation of a high-load operation region in the homogenous-charge compression ignition internal combustion engine are an increase in the internal EGR gas temperature due to an increase in combustion temperature and a reduction in the internal EGR gas amount caused with the increase in the internal EGR gas temperature, which affect the air/fuel mixture temperature.

Figure 3:
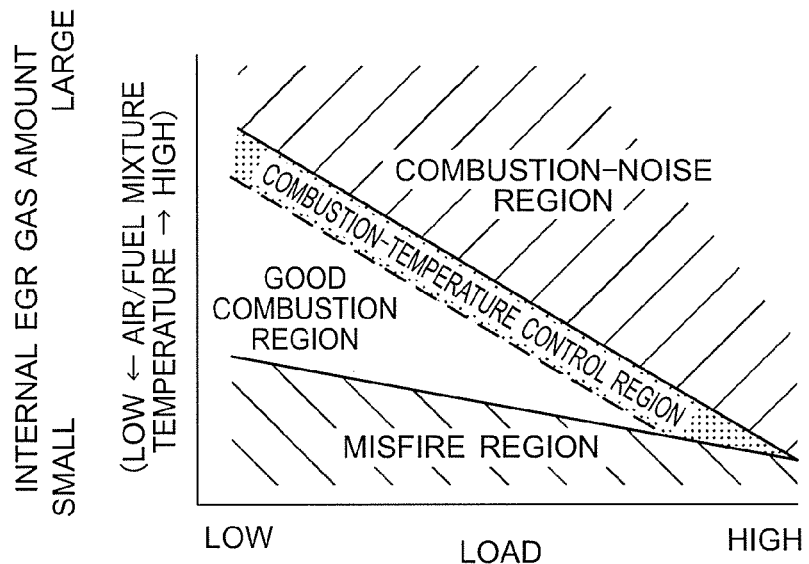
FIG. 3 is an explanatory diagram showing an effect of a load and an internal EGR gas amount on a combustion state in the control device for the internal combustion engine according to the first embodiment of the present invention.

Therefore, in the first embodiment of the present invention, with respect to the increase in the combustion temperature in the high-load state, which is a reason of the limitation of enlargement of the operation region in which the homogenous-charge compression ignition combustion can be performed, the combustion temperature is controlled to a low temperature side by active control of the ignition timing. In this manner, as shown in FIG. 3, an internal EGR gas temperature condition for enabling the internal EGR gas amount to be increased, represented by a combustion-temperature control region in which good combustion is obtained, is established. In this manner, a good combustion region is enlarged to a higher load side.

Specifically, when the first combustion-state index reaches a predefined predetermined upper limit value of the first combustion-state index, the combustion temperature is high. Therefore, in order to lower the temperature, the ignition timing is continuously controlled to the retard side until the second combustion-state index reaches a predefined predetermined upper limit value of the second combustion-state index.

On the other hand, when the second combustion-state index reaches the predetermined upper limit value of the second combustion-state index, the combustion temperature is low. Therefore, in order to increase the temperature, the ignition timing is continuously controlled to the advance side until the first combustion-state index reaches the predetermined upper limit value of the first combustion-state index.

By continuously and repeatedly controlling the ignition timing to the advance side and the retard side as described above, the effect of ignition assist on the air/fuel mixture temperature is changed to change the combustion state. As a result, the combustion temperature is controlled. Further, the effect is given even on the combustion in a next cycle as the internal EGR gas. Therefore, in the next cycle, the combustion temperature is further changed.

For example, by retarding the ignition assist, the effect of the ignition assist for increasing the air/fuel mixture temperature is lowered to lower the speed of the combustion. Thus, the combustion temperature is lowered. As a result, the internal EGR gas temperature is also lowered. Accordingly, in the next cycle, the combustion temperature is further lowered.

As described above, the combustion state is controlled by continuously and repeatedly controlling the ignition timing to the advance side and the retard side within the range between the predetermined upper limit value of the first combustion-state index and the predetermined upper limit value of the second combustion-state index, in which good combustion is obtained. In this manner, the combustion temperature is controlled to the low temperature side without being stabilized in a high combustion-temperature state. As a result, the good combustion region can be enlarged to the higher load side.

In the following, a specific content of control by the control device for the internal combustion engine according to the first embodiment of the present invention is described. First, a combustion start timing relating to the pre-ignition is extracted as the first combustion-state index and a combustion time period relating to the slow combustion is extracted as the second combustion-state index from an output waveform of the in-cylinder pressure sensor 17.

Next, in order to determine a state of the air/fuel mixture temperature, whether the combustion start timing has reached the predetermined upper limit value indicating a good combustion state or a high air/fuel mixture temperature and the combustion time period has reached the predetermined upper limit value indicating a good combustion state and a low air/fuel mixture temperature is determined.

When it is determined that the combustion start timing has reached the predetermined upper limit value and therefore the air/fuel mixture temperature is high, the ignition timing is subjected to the retard control so as to lower the combustion temperature. On the other hand, when it is determined that the combustion time period has reached the predetermined upper limit value and therefore the air/fuel mixture temperature is low, the ignition timing is subjected to the advance control so as to increase the combustion temperature.

By continuously and repeatedly executing the operation described above, the combustion temperature is controlled to the low temperature side without being stabilized in the high combustion-temperature state. In this manner, the internal EGR gas temperature condition which enables the internal EGR gas amount to be increased can be established. Therefore, the operation region in which the homogenous-charge compression ignition combustion can be performed can be enlarged.

If the combustion temperature is undesirably stabilized in the high combustion-temperature state and cannot be controlled by the ignition timing, the combustion temperature is lowered by interrupting the spark ignition. When the combustion start timing which is the first combustion-state index is lowered to the predetermined upper limit value of the first combustion-state index, the continuous and repeated control of the ignition timing to the advance side and the retard side is started again. Therefore, the operation region in which the homogenous-charge compression ignition combustion can be performed can be enlarged.

Figure 4:
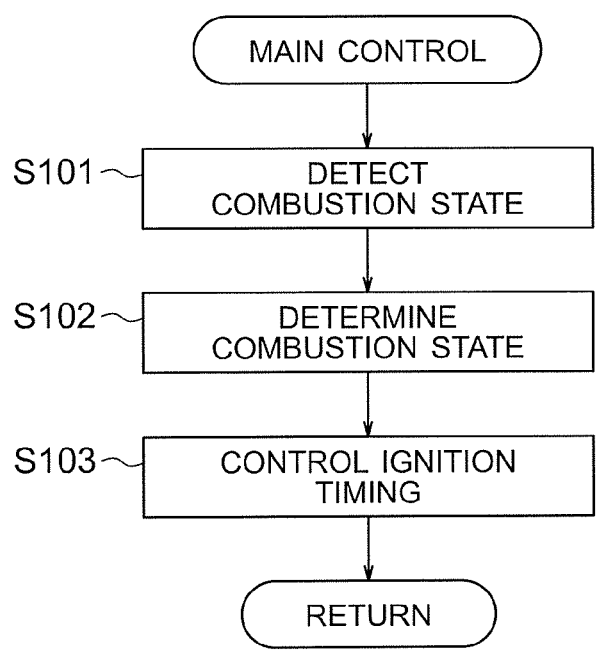
FIG. 4 is a flowchart illustrating main processing by the control device for the internal combustion engine according to the first embodiment of the present invention.

Control executed in the ECU 16 is now described referring to flowcharts of FIGS. 4 to 9. FIG. 4 is a flowchart illustrating main processing by the control device for the internal combustion engine according to the first embodiment of the present invention. The processing is executed for a corresponding cylinder at every 180 degrees of the crank angle when the processing is applied for, for example, a four-cylinder internal combustion engine.

First, the first combustion-state index and the second combustion-state index which indicate the combustion state are detected (Step S101).

Subsequently, the combustion state is determined based on the first combustion-state index and the second combustion-state index detected in Step S101 (Step S102).

Next, the ignition-timing control for continuously repeating the control of the ignition timing to the advance side and the control of the ignition timing to the retard side based on the combustion state determined in Step S102 is executed (Step S103). Then, the processing illustrated in FIG. 4 is terminated.

Figure 5:
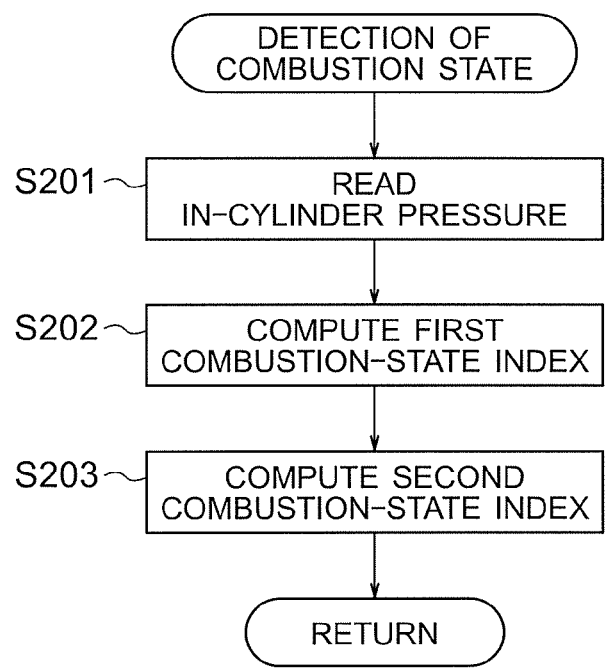
FIG. 5 is a flowchart illustrating combustion-state detection processing by the control device for the internal combustion engine according to the first embodiment of the present invention.

FIG. 5 is a flowchart illustrating combustion-state detection processing by the control device for the internal combustion engine according to the first embodiment of the present invention. Referring to FIG. 5, processing for computing the first combustion-state index and the second combustion-state index based on the signal from the in-cylinder pressure sensor 17 is described for the combustion-state detection processing performed in Step S101 illustrated in FIG. 4.

First, an in-cylinder pressure recorded for each degree of the crank angle is read based on the signal from the in-cylinder pressure sensor 17 (Step S201).

Subsequently, the combustion start timing relating to the pre-ignition is computed as the first combustion-state index (Step S202).

Next, the combustion time period relating to the slow combustion is computed as the second combustion-state index (Step S203). Then, the processing illustrated in FIG. 5 is terminated.

Figure 6:
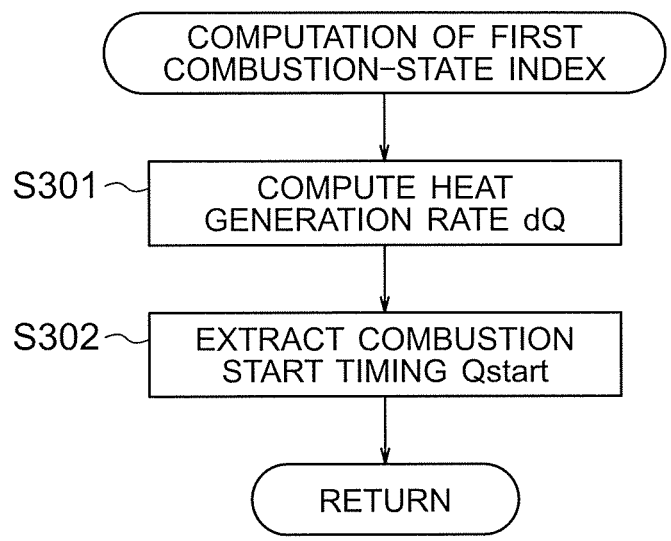
FIG. 6 is a flowchart illustrating first combustion-state index computation processing by the control device for the internal combustion engine according to the first embodiment of the present invention.

FIG. 6 is a flowchart illustrating first combustion-state index computation processing by the control device for the internal combustion engine according to the first embodiment of the present invention. Referring to FIG. 6, processing for computing the first combustion-state index, which is performed in Step S202 illustrated in FIG. 5, is described.

First, by using the following Expression (1), a heat generation rate dQ [J/deg] is computed for each cycle (Step S301).

$$dQ[n]=V[n] \times dP[n]+k \times P[n] \times dV[n])/(k-1) \quad (1)$$

In Expression (1), V is a combustion-chamber capacity [m$^3$], dP is an in-cylinder pressure increase rate [Pa/deg], k is a specific heat ratio, P is an in-cylinder pressure [Pa], dV is a combustion-chamber capacity change rate [m$^3$/deg], and n is the number of cycles.

Subsequently, based on the heat generation ratio dQ computed in Step S301, a combustion start timing Qstart is extracted (Step S302). Then, the processing illustrated in FIG. 6 is terminated. Specifically, a search is started at the crank angle at which the heat generation ratio dQ becomes maximum to the advance side. The crank angle at which the heat generation ratio dQ becomes 0 is determined as the combustion start timing Qstart [deg].

Figure 7:
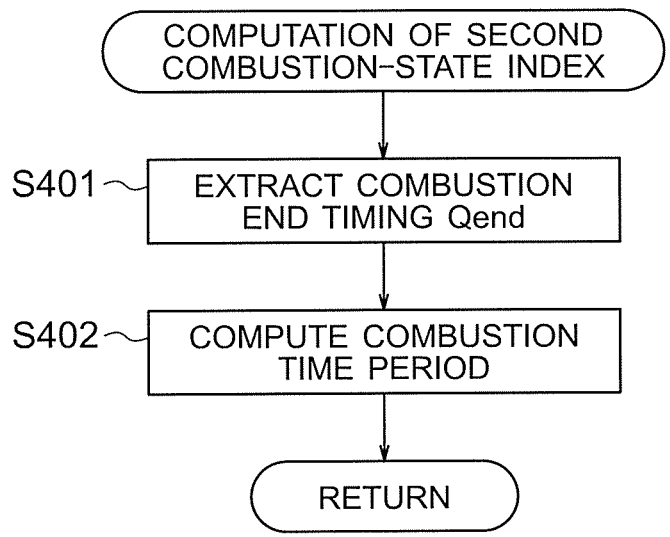
FIG. 7 is a flowchart illustrating second combustion-state index computation processing by the control device for the internal combustion engine according to the first embodiment of the present invention.

FIG. 7 is a flowchart illustrating second combustion-state index computation processing by the control device for the internal combustion engine according to the first embodiment of the present invention. Referring to FIG. 7, processing for computing the second combustion-state index, which is performed in Step S203 illustrated in FIG. 5, is described.

First, based on the heat generation ratio dQ [J/deg] computed in Step S301 illustrated in FIG. 6, a combustion end timing Qend is extracted (Step S401). Specifically, a search is started at the crank angle at which the heat generation ratio dQ becomes maximum to the retard side. The crank angle at which the heat generation ratio dQ becomes 0 is determined as the combustion end timing Qend [deg].

Subsequently, the combustion start timing Qstart extracted in Step S302 illustrated in FIG. 6 is subtracted from the combustion end timing Qend extracted in Step S401 to calculate a combustion time period Qang [deg] as expressed by the following Expression (2) (Step S402). Then, the processing illustrated in FIG. 7 is terminated.

$$Q\text{ang}=Q\text{end}-Q\text{start} \quad (2)$$

Figure 8:
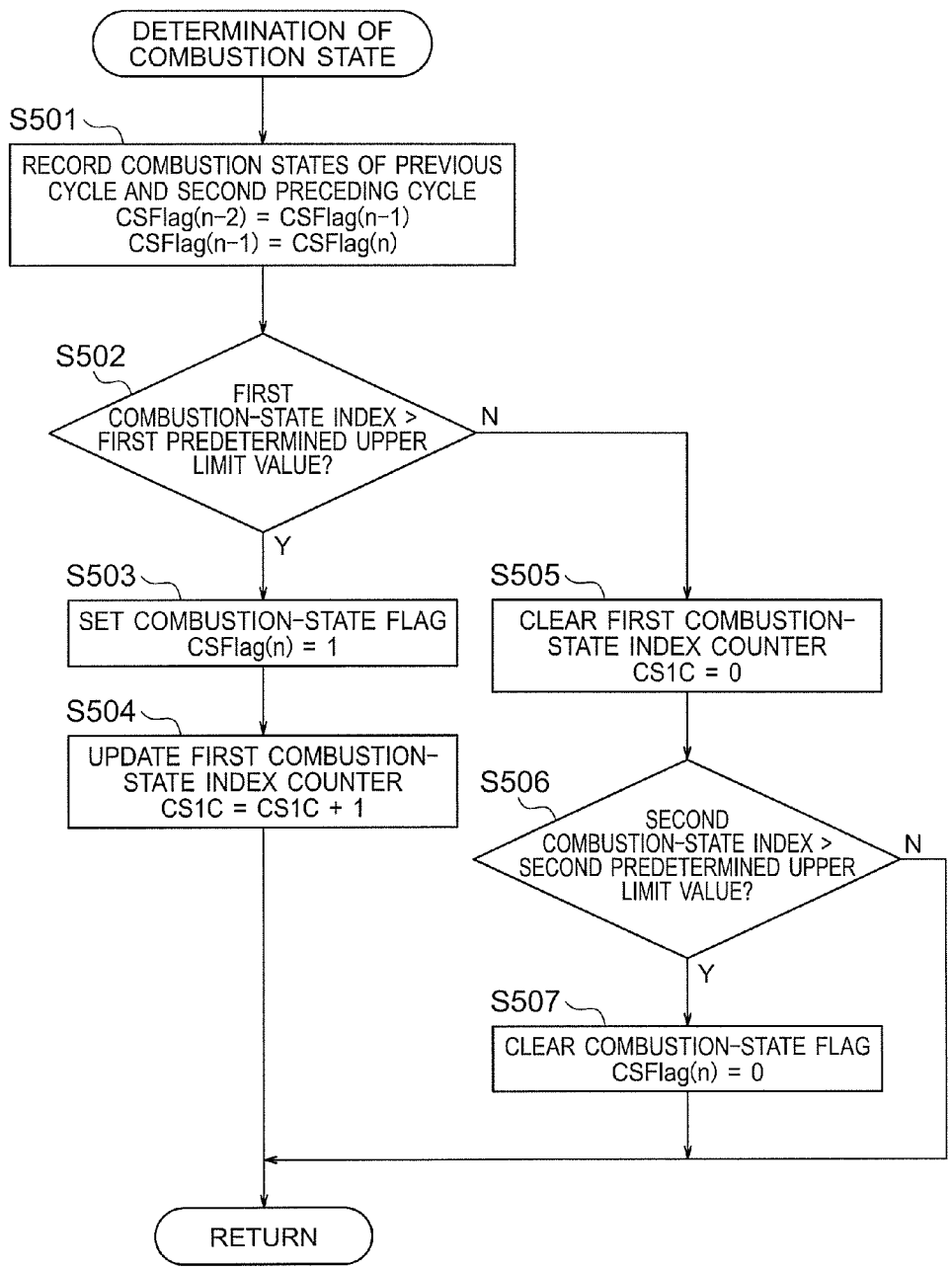
FIG. 8 is a flowchart illustrating combustion-state determination processing by the control device for the internal combustion engine according to the first embodiment of the present invention.

FIG. 8 is a flowchart illustrating combustion-state determination processing by the control device for the internal combustion engine according to the first embodiment of the present invention. Referring to FIG. 8, processing for determining the combustion state based on the first combustion-state index and the second combustion-state index detected in Step S101 illustrated in FIG. 4 is described for the combustion-state determination processing performed in Step S102 illustrated in FIG. 4.

First, the combustion states of, for example, the previous cycle and the second preceding cycle are recorded so as to determine that the ignition timing is immediately after being switched by the advance control and the retard control (Step S501). Specifically, a combustion-state flag CSFlag(n−1) is assigned to a combustion-state flag CSFlag(n−2), whereas a combustion-state flag CSFlag(n) is assigned to a combustion-state flag CSFlag(n−1).

Subsequently, it is determined whether or not the combustion start timing which is the first combustion-state index is larger than a predefined first predetermined upper limit value of the first combustion-state index (Step S502). In this case, the first predetermined upper limit value is a value extracted from a map of the crank angle, for example, retarded by two degrees in crank angle from the combustion start timing in the case of the pre-ignition, which is extracted in advance by an experiment based on the engine rpm and the load, based on the engine rpm and the load.

In Step S502, when it is determined that the first combustion-state index is larger than the first predetermined upper limit value (that is, Yes), 1 is assigned to the combustion-state flag CSFlag(n) to indicate that the combustion start timing which is the first combustion-state index has reached the first predetermined upper limit value, to thereby set the combustion-state flag (Step S503). This value means that the combustion start timing advances to a limit at which the pre-ignition occurs and therefore, the combustion temperature is in a high combustion-temperature state.

Next, a first combustion-state index counter CS1C indicating the number of cycles during which the above-mentioned condition lasts is updated (Step S504). Then, the processing illustrated in FIG. 8 is terminated. Specifically, the first combustion-state index counter CS1C is incremented.

On the other hand, in Step S502, when it is determined that the first combustion-state index is equal to or smaller than the first predetermined upper limit value (that is, No), the first combustion-state index counter CS1C is cleared (Step S505).

Subsequently, it is determined whether or not the combustion time period which is the second combustion-state index is larger than a predefined second predetermined upper limit value of the second combustion-state index (Step S506). In this case, the second predetermined upper limit value is a value extracted from a map of the crank angle, for example, reduced by 2 degrees in crank angle from the combustion time period in the case of the slow combustion occurring in the vicinity of a misfire region, which is extracted in advance by an experiment based on the engine rpm and the load, based on the engine rpm and the load.

In Step S506, when it is determined that the second combustion-state index is larger than the second predetermined upper limit value (that is, Yes), 0 is assigned to the combustion-state flag CSFlag(n) to indicate that the combustion time period which is the second combustion-state index has reached the second predetermined upper limit value, to thereby clear the combustion-state flag (Step S507). Then, the processing illustrated in FIG. 8 is terminated.

The above-mentioned condition means that the combustion state is close to a misfire limit and a slow combustion limit, and the combustion temperature is low.

On the other hand, in Step S506, when it is determined that the second combustion-state index is equal to or smaller than the second predetermined upper limit value (that is, No), the processing illustrated in FIG. 8 is terminated without changing the combustion-state flag.

Figure 9:
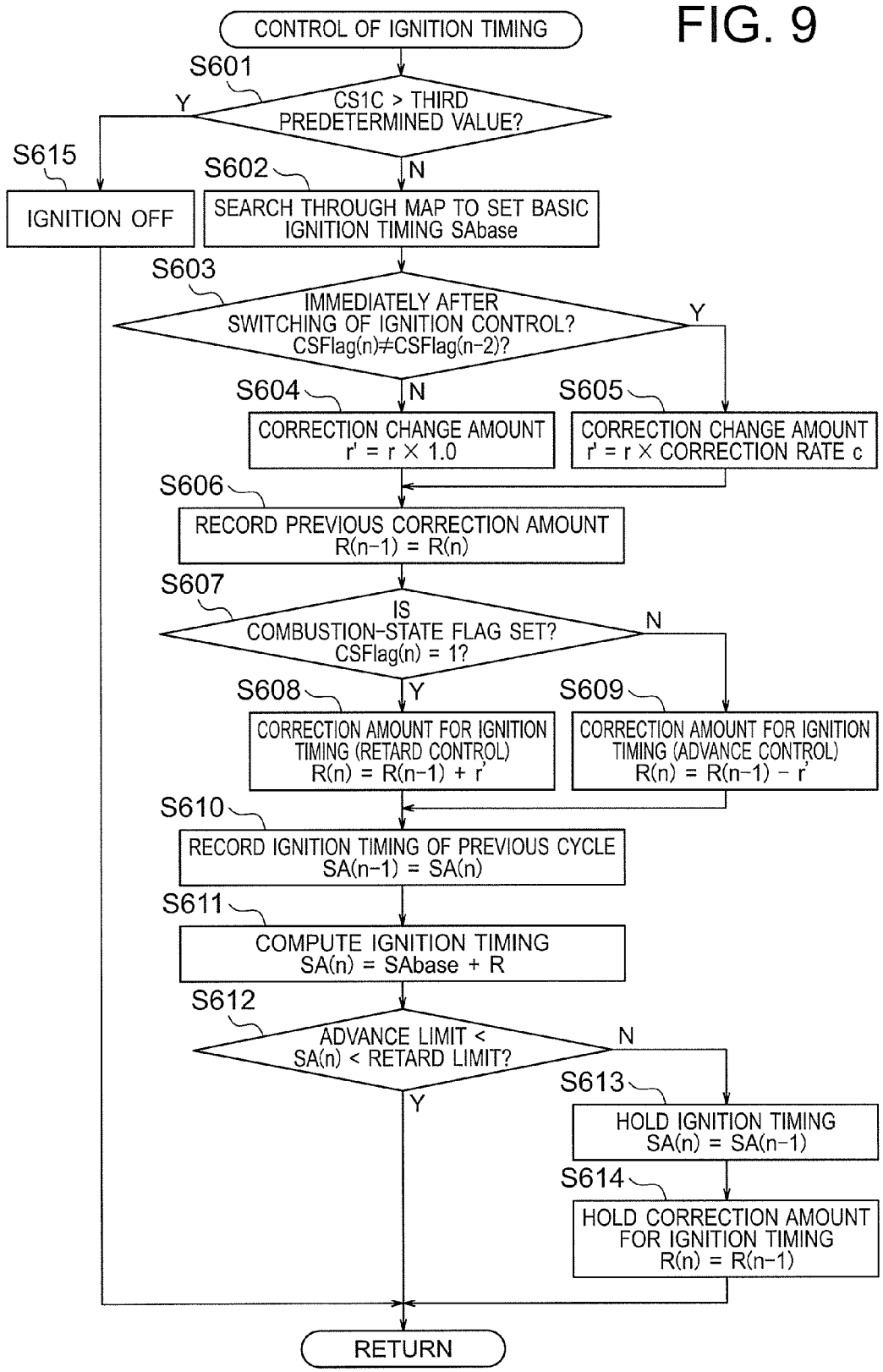
FIG. 9 is a flowchart illustrating ignition-timing control processing by the control device for the internal combustion engine according to the first embodiment of the present invention.

FIG. 9 is a flowchart illustrating ignition-timing control processing by the control device for the internal combustion engine according to the first embodiment of the present invention. Referring to FIG. 9, processing for controlling the ignition timing based on the combustion state determined in Step S102 illustrated in FIG. 4 is described for the ignition-timing control processing performed in Step S103 illustrated in FIG. 4.

First, it is determined whether or not the value of the first combustion-state index counter CS1C is larger than a predefined third predetermined value (Step S601). In this case, the third predetermined value is an arbitrary set value, and is, for example, five cycles.

In Step S601, when it is determined that the value of the first combustion-state index counter CS1C is equal to or smaller than the third predetermined value (that is, No), the basic ignition timing SAbase is set based on the engine rpm and the load (Step S602). The basic ignition timing SAbase is set based on a map obtained in advance by an experiment based on the engine rpm and the load.

Subsequently, it is determined whether or not the ignition timing is immediately after being switched by the advance control and the retard control (Step S603). Specifically, it is determined based on the combustion-state flag whether or not, for example, the combustion-state flag CSFlag (n−2) of the second preceding cycle is the same as the combustion-state flag CSFlag(n) of the current cycle in the middle of processing.

In Step S603, it is determined that the ignition timing is not immediately after being switched (the combustion-state flags are the same) (that is, No), the correction change amount r in accordance with the load is multiplied by 1.0 as the correction rate to calculate the correction change amount r' (Step S604). The correction change amount r is set to a larger value as the load and the combustion temperature become higher because the effect provided by the ignition timing on the combustion temperature becomes smaller with the higher load and combustion temperature.

On the other hand, in Step S603, when it is determined that the ignition timing is immediately after being switched (the combustion-state flags are different) (that is, Yes), the correction change amount r in accordance with the load is multiplied by a correction rate c which is larger than 1.0 so that the correction change amount r' becomes larger than that set in Step S604. In this manner, the correction change amount r' is calculated (Step S605). The correction rate c is also set to a larger value as the load becomes higher.

Immediately before and after the direction of control of the ignition timing is switched, the condition is close to a limit at which good combustion is obtained. Therefore, there are a possibility of an excessively lowered internal EGR gas temperature which affects the combustion of the next cycle, which is caused by the combustion temperature lowered by the retard control of the ignition timing and a possibility of occurrence of misfire and generation of combustion noise due to an increase in the combustion temperature, caused by the advance control. Therefore, immediately after the switching of the direction of control of the ignition timing, the above-mentioned possibilities are lowered by increasing the correction change amount. In this manner, the condition can be returned in an early phase to the condition under which good combustion is obtained.

Next, an ignition-timing correction amount of the previous cycle is recorded (Step S606). Specifically, an ignition-timing correction amount R(n) is assigned to an ignition-timing correction amount R(n−1).

Subsequently, in order to determine the direction of control of the ignition timing, it is determined whether or not the combustion-state flag CSFlag(n) is set (Step S607). Specifically, whether the combustion-state flag CSFlag(n) is set to one or is cleared to zero is determined.

In Step S607, when it is determined that the combustion-state flag is set (that is, Yes), the combustion start timing which is the first combustion-state index has reached the first predetermined upper limit value and therefore, the combustion temperature is in the high combustion-temperature state. Therefore, in order to lower the combustion temperature, the ignition-timing correction amount is corrected to the retard side (Step S608).

Specifically, a value obtained by adding the correction change amount r' calculated in Step S604 or S605 to the ignition-timing correction amount R(n−1) of the previous cycle is determined as the ignition-timing correction amount R(n).

On the other hand, in Step S607, when it is determined that the combustion-state flag is not set (that is, No), the combustion time period which is the second combustion-state index has reached the second predetermined upper limit value and the combustion temperature is therefore in the low combustion-temperature state. Therefore, in order to increase the combustion temperature, the ignition-timing correction amount is corrected to the advance side (Step S609).

Specifically, a value obtained by subtracting the correction change amount r' calculated in Step S604 or S605 from the ignition-timing correction amount R(n−1) of the previous cycle is determined as the ignition-timing correction amount R(n).

Next, the ignition timing of the previous cycle is recorded (Step S610). Specifically, an ignition timing SA(n) is assigned to an ignition timing SA(n−1).

Subsequently, the ignition-timing correction amount R computed in Step S608 or S609 is added to the basic ignition timing SAbase set in Step S602 to compute an ignition timing SA (Step S611).

Next, it is determined whether or not the ignition timing computed in Step S611 exceeds an advance limit and a retard limit (whether or not the ignition timing SA(n) lies within the range between the advance limit and the retard limit) (Step S612).

In Step S612, when it is determined that the ignition timing does not exceed the advance limit and the retard limit (that is, Yes), the processing illustrated in FIG. 9 is terminated. Then, the spark ignition is executed at the ignition timing SA computed in Step S611.

In this case, the advance limit and the retard limit are ignition timings extracted in advance by an experiment in accordance with the engine rpm. The ignition timing at which self-ignition by the compression becomes earlier than the spark ignition to generate no change in the second combustion-state index when the ignition timing is retarded is determined as the retard limit. On the other hand, the ignition timing with no change in the first combustion-state index even when the ignition timing is advanced is determined as the advance limit.

On the other hand, in Step S612, when it is determined that the ignition timing exceeds the advance limit or the retard limit (that is, No), the ignition timing of the previous cycle is determined as the ignition timing of the current cycle in the middle of processing (Step S613). Specifically, the ignition timing SA(n−1) is assigned to the ignition timing SA(n).

Subsequently, the ignition-timing correction amount of the previous cycle is determined as the ignition-timing correction amount of the current cycle in the middle of processing (Step S614). Then, the processing illustrated in FIG. 9 is terminated. Specifically, the ignition-timing correction amount R(n−1) is assigned to the ignition-timing correction amount R(n).

The above-mentioned processing is performed for the following reason. If the ignition timing exceeds the advance limit or the retard limit, the combustion state is present in a dead zone in which a change in the combustion temperature cannot be obtained even when the advance correction or the retard correction is further executed. Therefore, in view of responsiveness of the ignition timing to the combustion temperature immediately after the direction of control of the ignition timing is switched, the processing is performed so as not to control the ignition timing beyond the advance limit or the retard limit.

As described above, the ignition timing is controlled within the range in which the responsiveness is high to the combustion temperature. Therefore, the occurrence of misfire and the generation of combustion noise can be prevented.

On the other hand, in Step S601, when it is determined that the value of the first combustion-state index counter CS1C is larger than the third predetermined value (Specifically Yes), a state in which the first combustion-state index exceeds the first predetermined upper limit value lasts even after the ignition timing is subjected to the retard control. This state means that the combustion temperature is stable in the high combustion-temperature state.

Therefore, in order to actively lower the combustion temperature, the spark ignition is interrupted (ignition is turned OFF) (Step S615). Then, the processing illustrated in FIG. 9 is terminated.

In the above-mentioned manner, the combustion temperature is lowered to a temperature at which the combustion start timing which is the first combustion-state index becomes equal to or smaller than the first predetermined upper limit value. When the combustion start timing becomes equal to or smaller than the first predetermined upper limit value, the first combustion-state index counter is cleared in Step S505 illustrated in FIG. 8. Then, the processing of continuously and repeatedly controlling the ignition timing to the advance side and the retard side is started again. Therefore, the operation region in which the homogenous-charge compression ignition combustion can be performed can be enlarged.

Figure 10:
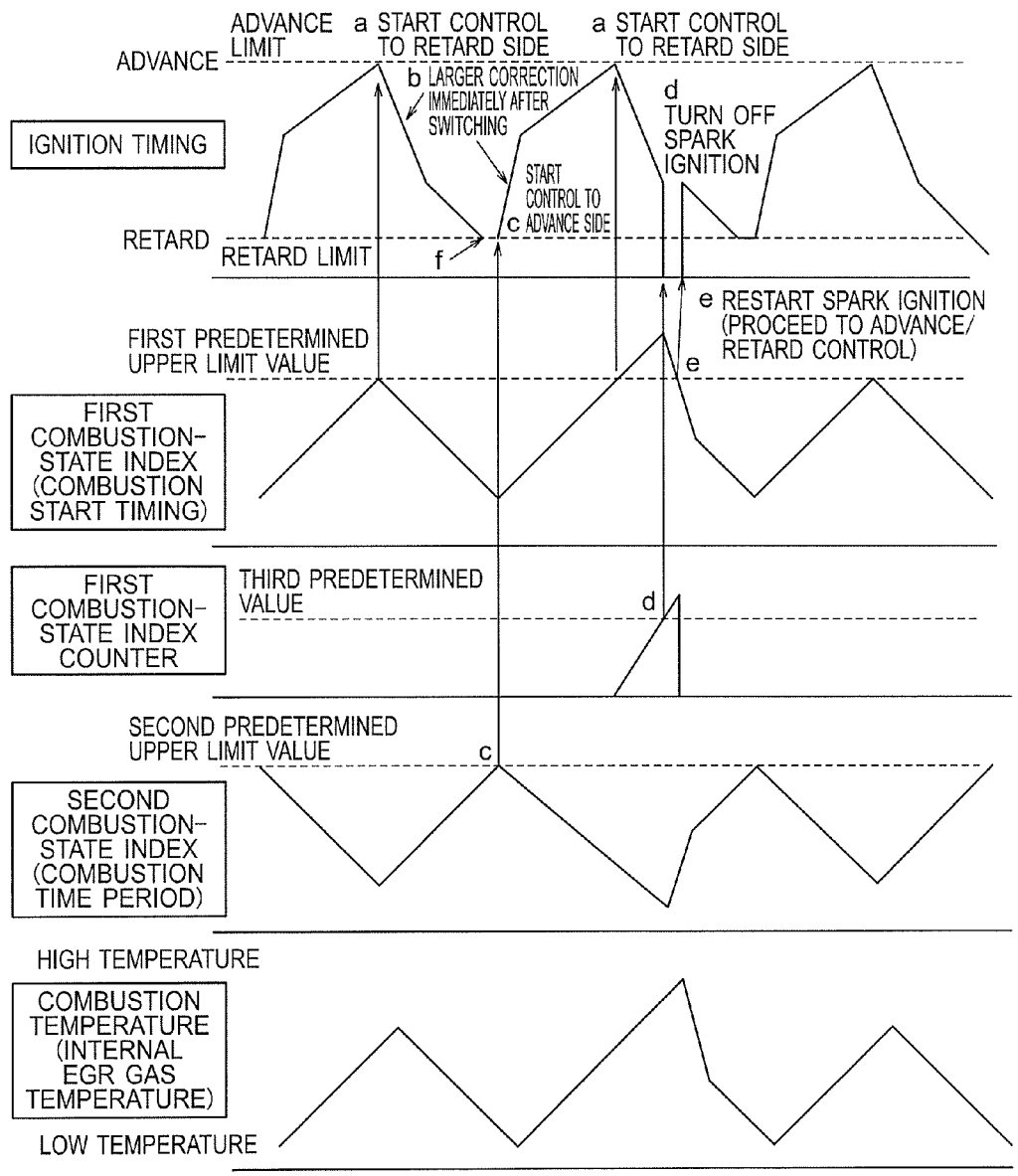
FIG. 10 is a timing chart illustrating an operation of the control device for the internal combustion engine according to the first embodiment of the present invention.

Referring to a timing chart of FIG. 10, the result of the control executed by the ECU 16 is now described. FIG. 10 is a timing chart illustrating an operation of the control device for the internal combustion engine according to the first embodiment of the present invention.

As illustrated in FIG. 10, the combustion temperature increases along with the advance control of the ignition timing. Then, when the combustion start timing which is the first combustion-state index computed in the processing illustrated in FIG. 6 reaches the first predetermined upper limit value indicating the combustion start timing close to the limit at which the pre-ignition occurs as indicated by the point a, the ignition timing is controlled to the retard side.

Before and after the switching of the direction of control of the ignition timing, the combustion state is under the condition close to the limit at which good combustion is obtained. Therefore, there is a possibility of generation of the combustion noise by the pre-ignition due to the increase in the combustion temperature, which is caused by the advance control of the ignition timing. Thus, the correction amount for the ignition timing immediately after the switching is set large as indicated by the lines b, thereby avoiding the generation of the combustion noise due to the pre-ignition.

Thereafter, the combustion temperature starts dropping by the retard control of the ignition timing. As a result, the combustion time period which is the second combustion-state index increases. However, if the ignition timing reaches the retard limit before the second combustion-state index reaches the second predetermined upper limit value, the retard control is not further performed but the ignition timing is kept at the retard limit as indicated by the point f.

In this case, on the advance side and the retard side of the ignition timing, there exist dead zones in which the change of the ignition timing does not change the first combustion-state index or the second combustion-state index even when the correction amount for the ignition timing is increased. Therefore, by providing the limits to the range of control of the ignition timing, ignition-timing control with good responsiveness to the combustion temperature can be performed when the direction of control of the ignition timing is switched.

Thereafter, the internal EGR gas temperature which affects the combustion in the next cycle is further lowered by a reduction in the combustion temperature caused by the retard control of the ignition timing. When the combustion time period which is the second combustion-state index computed in the processing illustrated in FIG. 7 reaches the second predetermined upper limit value indicating the combustion time period close to the limit at which the slow combustion occurs as indicated by the point c, the ignition timing is controlled to the advance side to increase the combustion temperature.

As described above, the ignition timing is continuously and repeatedly controlled to the advance side and the retard side within the range between the predetermined upper limit value of the first combustion-state index and the predetermined upper limit value of the second combustion-state index, in which the responsiveness to the combustion temperature is high to obtain good combustion. As a result, the combustion temperature can be controlled to the low temperature side without being stabilized in the high combustion-temperature state, thereby increasing the internal EGR gas amount. Therefore, the operation region in which the homogenous-charge compression ignition combustion can be performed can be enlarged.

Even if the combustion temperature is undesirably stabilized in the high combustion-temperature state and if the first combustion-state index continues increasing after exceeding the first predetermined upper limit value and hence the value of the first combustion-state index counter becomes larger than a third predetermined value even when the ignition timing is retarded, the spark ignition is interrupted as indicated by the point d.

The combustion temperature is lowered by interrupting the spark ignition. When the combustion start timing which is the first combustion-state index is lowered to the first predetermined upper limit value as indicated by the point e and the air/fuel mixture temperature drops, the continuous and repeated control of the ignition timing to the advance side and the retard side is started again. Therefore, the operation region in which the homogenous-charge compression ignition combustion can be performed can be enlarged.

As described above, by continuously and repeatedly controlling the ignition timing to the advance side and the retard side within the range of the combustion state in which good combustion is obtained while preventing the pre-ignition and the slow combustion which cause the misfire or generate the combustion noise, the combustion temperature can be controlled to the low temperature side without being stabilized in the high combustion-temperature state. Therefore, the operation region in which the homogenous-charge compression ignition combustion can be performed can be enlarged.

As described above, according to the first embodiment, the ignition-timing control section continuously and repeatedly controls the ignition timing to the retard side when the first combustion-state index reaches the predefined predetermined upper limit value of the first combustion-state index and controls the ignition timing to the advance side when the second combustion-state index reaches the predefined predetermined upper limit value of the second combustion-state index.

Therefore, the operation region in which the homogenous-charge compression ignition combustion enabling the suppression of generation of NOx and the improvement of fuel efficiency can be performed can be enlarged.

Second Embodiment

In the following, a specific content of control performed by a control device for an internal combustion engine according to a second embodiment of the present invention is described. In the second embodiment of the present invention, a combustion speed relating to rapid combustion which causes the combustion noise is extracted as the first combustion-state index and a combustion fluctuation generated by the combustion destabilized by a low air/fuel mixture temperature is extracted as the second combustion-state index from the output waveform of the in-cylinder pressure sensor 17.

The pre-ignition described above in the first embodiment is a phenomenon which occurs when a temperature of apart of the air/fuel mixture is high. On the other hand, the rapid combustion is a phenomenon which occurs when the temperature of the air/fuel mixture becomes high in average. When the air/fuel mixture temperature is low, the slow combustion described in the first embodiment occurs and the combustion is destabilized by the reduction in the air/fuel mixture temperature. The destabilized combustion affects the internal EGR gas in the next cycle. Therefore, the combustion fluctuation is likely to become larger.

In the second embodiment of the present invention, the combustion state is controlled by continuously and repeatedly controlling the ignition timing to the advance side and the retard side within the range of the combustion state in which good combustion is obtained while the rapid combustion and the combustion fluctuation which cause misfire and generate combustion noise are prevented. As a result, the combustion temperature can be controlled to the low temperature side without being stabilized in the high combustion-temperature state. Therefore, the operation region in which the homogenous-charge compression ignition combustion can be performed can be enlarged.

Figure 11:
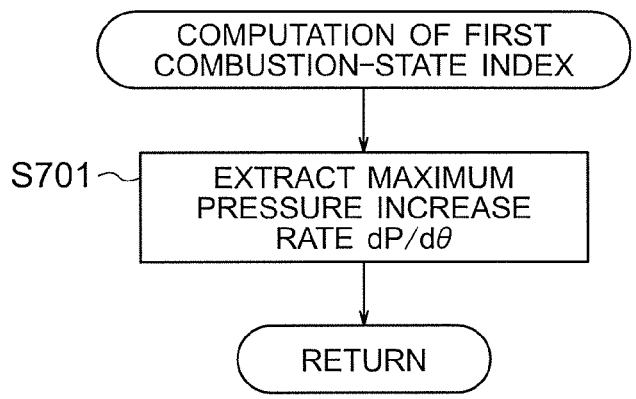
FIG. 11 is a flowchart illustrating first combustion-state index computation processing by a control device for an internal combustion engine according to second embodiment of the present invention.
Figure 12:
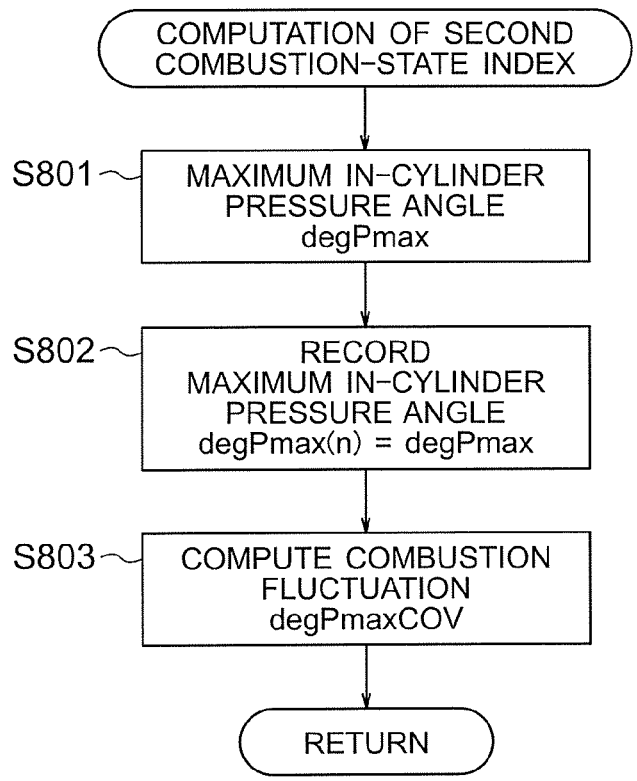
FIG. 12 is a flowchart illustrating second combustion-state index computation processing by the control device for the internal combustion engine according to the second embodiment of the present invention.
Figure 13:
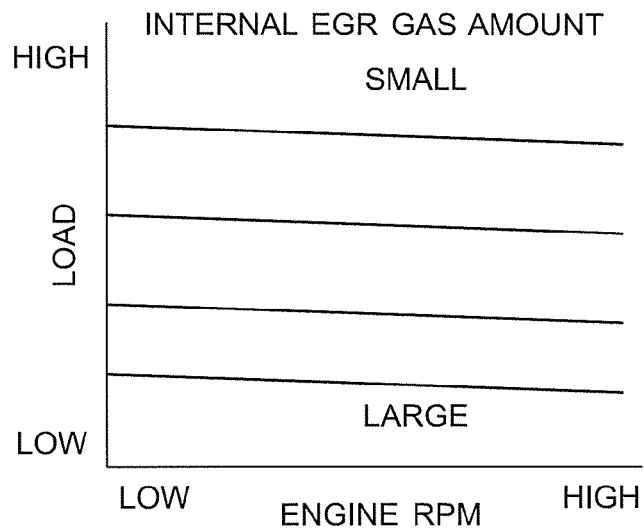
FIG. 13 is an explanatory diagram showing setting of an internal EGR gas amount with respect to an engine rpm and a load.
Figure 14:
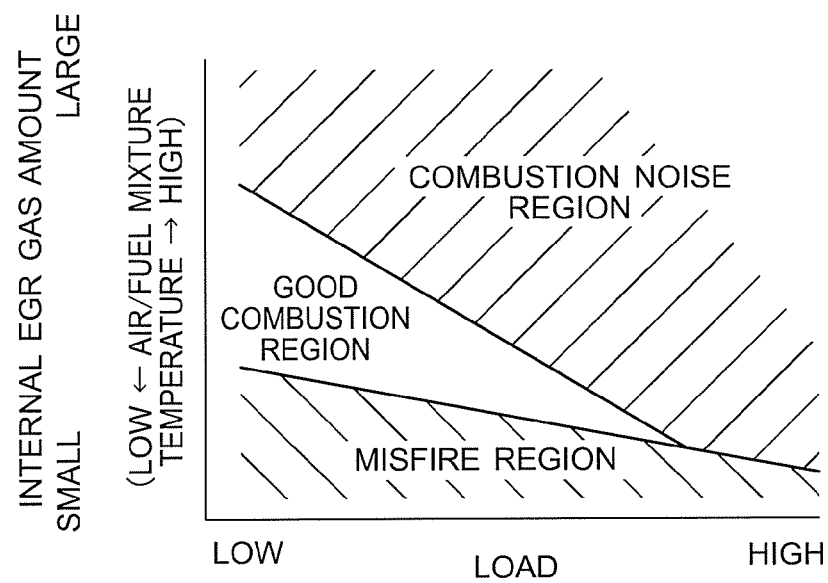
FIG. 14 is an explanatory diagram showing an effect of the load and the internal EGR gas amount on a combustion state.

Referring to flowcharts of FIGS. 11 and 12, control performed by the ECU 16 is now described. The description of the same processing as that of the first embodiment described above is herein omitted. Specifically, the combustion-state detection processing performed in Step S101 illustrated in FIG. 4 is described referring to FIGS. 6, 11, and 12 for extraction of a maximum pressure increase rate relating to the rapid combustion, which is the first combustion-state index, and computation of the combustion fluctuation, which is the second combustion-state index. The combustion-state determination processing performed in Step S102 illustrated in FIG. 4 is described referring to FIG. 8. The combustion-state detection processing and the combustion-state determination processing described above constitute a difference from the first embodiment.

First, in the processing illustrated in FIG. 5, the in-cylinder pressure recorded for each degree of the crank angle is read based on the signal from the in-cylinder pressure sensor 17 (Step S201).

Subsequently, the maximum pressure increase rate relating to the rapid combustion is computed as the first combustion-state index (Step S202).

Next, the combustion fluctuation is computed as the second combustion-state index (Step S203). Then, the processing illustrated in FIG. 5 is terminated.

FIG. 11 is a flowchart illustrating the first combustion-state index computation processing by the control device for the internal combustion engine according to the second embodiment of the present invention.

As illustrated in FIG. 11, a maximum value of the pressure changing for each degree of the crank angle is extracted as the maximum pressure increase rate (dP/de) from the information of the in-cylinder pressure read for each degree of the crank angle in Step S201 illustrated in FIG. 5 (Step S701). Then, the processing illustrated in FIG. 11 is terminated.

FIG. 12 is a flowchart illustrating the second combustion-state index computation processing by the control device for the internal combustion engine according to the second embodiment of the present invention.

As illustrated in FIG. 12, the crank angle at which the in-cylinder pressure becomes maximum is extracted as a maximum in-cylinder pressure angle degPmax for each cycle from the information of the in-cylinder pressure read for each degree of the crank angle in Step S201 illustrated in FIG. 5 (Step S801).

Subsequently, the maximum in-cylinder pressure angle degPmax extracted in Step S801 is recorded in the memory (Step S802). Specifically, the extracted maximum in-cylinder pressure angle degPmax is assigned to a maximum in-cylinder pressure angle degPmax(n).

Next, based on the maximum in-cylinder pressure angle recorded in Step S802, a combustion fluctuation degPmax-COV is computed as expressed by the following Expression (3) (Step S803). Then, the processing illustrated in FIG. 12 is terminated.

$$\text{deg}P\text{maxCOV} = \text{deg}P\text{max standard deviation}/\text{deg}P\text{max average value} \qquad (3)$$

Subsequently, the combustion-state determination processing using the maximum pressure increase rate as the first combustion-state index and the combustion fluctuation as the second combustion-state index is described referring to FIG. 8.

As illustrated in FIG. 8, in Step S502, it is determined whether or not the maximum pressure increase rate has reached a predetermined upper limit value of the first combustion-state index, at which the combustion temperature is high to generate the combustion noise, for example, 500 kPa/deg by using the maximum pressure increase rate which is the first combustion-state index, which is computed in the processing illustrated in FIG. 11.

In Step S502, when it is determined that the maximum pressure increase rate is larger than the predetermined upper limit value of the first combustion-state index (that is, Yes), 1 is assigned to the combustion-state flag CSFlag(n) to indicate that the first combustion-state index has reached the predetermined upper limit value, to thereby set the combustion-state flag (Step S503).

In Step S506, it is determined whether or not the combustion fluctuation has reached a predetermined upper limit value of the second combustion-state index at which the combustion temperature is low and the combustion state is close to the misfire region to cause the combustion fluctuation, for example, 5%.

In Step S506, it is determined that the combustion fluctuation is larger than the predetermined upper limit value of the second combustion-state index (that is, Yes), 0 is assigned to the combustion-state flag CSFlag(n), to thereby clear the combustion-state flag (Step S507).

As described above, according to the second embodiment, the combustion state is controlled by continuously and repeatedly controlling the ignition timing to the advance side and the retard side within the range of the combustion state in which good combustion is obtained, based on the result of determination of the combustion state. In this manner, the combustion temperature is controlled to the low temperature side without being stabilized in the high combustion-temperature state while the rapid combustion and the combustion fluctuation which cause the misfire and generate the combustion noise are prevented. Therefore, the operation region in which the homogenous-charge compression ignition combustion can be performed can be enlarged.

In the first and second embodiments of the present invention, the first combustion-state index and the second combustion-state index are detected by using the in-cylinder pressure sensor. However, the present invention is not limited thereto. Other means, for example, a crank-angle sensor or an ion-current sensor may be used as long as the combustion state can be detected.

In the first and second embodiments described above, the pre-ignition used as the first combustion-state index is detected based on the combustion start timing, whereas the rapid combustion is detected based on the maximum pressure increase rate. However, the present invention is not limited thereto. For example, other parameters indicating the pre-ignition and the rapid combustion, such as a timing at which an ion current becomes maximum or an angular acceleration of the crank angle may be used.

Similarly, as the second combustion-state index, the slow combustion or the combustion fluctuation is detected based on a variation in the position at which the combustion time period or the in-cylinder pressure becomes maximum. However, the present invention is not limited thereto. Other parameters indicating the slow combustion and the combustion fluctuation may be used instead.

What is claimed is:

1. A control device for an internal combustion engine including an ignition device provided in a combustion chamber, the ignition device being configured to ignite an air/fuel mixture formed in the combustion chamber, the internal combustion engine being configured to combust a part of the air/fuel mixture, which is located in areas other than in vicinity of the ignition device, by homogenous-charge compression ignition combustion using an increase in temperature, which is caused by combusting a part of the air/fuel mixture in the vicinity of the ignition device with spark ignition, and an increase in temperature caused by a combustion pressure, the control device comprising:

a combustion-state detecting section for detecting a first combustion-state index relating to a combustion state brought about by the air/fuel mixture at a high temperature and a second combustion-state index relating to a combustion state brought about by the air/fuel mixture at a low temperature; and an ignition-timing control section for controlling an ignition timing based on the first combustion-state index and the second combustion-state index, the ignition-timing control section being configured to continuously and repeatedly control the ignition timing to a retard side when the first combustion-state index reaches a predefined predetermined upper limit value of the first combustion-state index and control the ignition timing to an advance side when the second combustion-state index reaches a predefined predetermined upper limit value of the second combustion-state index.

2. A control device for an internal combustion engine according to claim 1, wherein the combustion-state detecting section detects a combustion-state quantity relating to pre-ignition corresponding to an advanced self-ignition timing as the first combustion-state index.

3. A control device for an internal combustion engine according to claim 1, wherein the combustion-state detecting section detects a combustion-state quantity relating to slow combustion corresponding to a low combustion speed as the second combustion-state index.

4. A control device for an internal combustion engine according to claim 1, wherein the combustion-state detecting section detects a combustion-state quantity relating to rapid combustion corresponding to a high combustion speed as the first combustion-state index.

5. A control device for an internal combustion engine according to claim 1, wherein the combustion-state detecting section detects a combustion-state quantity relating to a combustion fluctuation corresponding to destabilized combustion as the second combustion-state index.

6. A control device for an internal combustion engine according to claim 1, wherein the ignition-timing control section sets a correction amount for the ignition timing to be larger immediately after switching between retard control and advance control than in other cases.

7. A control device for an internal combustion engine according to claim 1, wherein the ignition-timing control section provides an advance limit and a retard limit to the ignition timing and controls the ignition timing within a range between the advance limit and the retard limit.

8. A control device for an internal combustion engine according to claim 1, wherein the ignition-timing control section stops the spark ignition when the first combustion-state index exceeds the predetermined upper limit value of the first combustion-state index by a predefined predetermined number of cycles.

9. A control method for an internal combustion engine including an ignition device provided in a combustion chamber, the ignition device being configured to ignite an air/fuel mixture formed in the combustion chamber, the internal combustion engine being configured to combust apart of the air/fuel mixture, which is located in areas other than in vicinity of the ignition device, by homogenous-charge compression ignition combustion using an increase in temperature, which is caused by combusting apart of the air/fuel mixture in the vicinity of the ignition device with spark ignition, and an increase in temperature caused by a combustion pressure, the control method comprising:

detecting a first combustion-state index relating to a combustion state brought about by the air/fuel mixture at a high temperature and a second combustion-state index relating to a combustion state brought about by the air/fuel mixture at a low temperature; and
controlling an ignition timing based on the first combustion-state index and the second combustion-state index,
the controlling an ignition timing comprising continuously and repeatedly executing processing of controlling the ignition timing to a retard side when the first combustion-state index reaches a predefined predetermined upper limit value of the first combustion-state index and controlling the ignition timing to an advance side when the second combustion-state index reaches a predefined predetermined upper limit value of the second combustion-state index.

\* \* \* \* \*